US011647689B2

(12) United States Patent
Tabata (10) Patent No.: US 11,647,689 B2
(45) Date of Patent: May 16, 2023

(54) FLUID INJECTION SYSTEM

(71) Applicants: EVERRIS INTERNATIONAL B.V., Heerlen (NL); Masahide Tabata, Chiba (JP)

(72) Inventor: Masahide Tabata, Chiba (JP)

(73) Assignee: EVERRIS INTERNATIONAL B.V., Heerlen (NL)

( * ) Notice: Subject to any disclaimer, the term of this patent is extended or adjusted under 35 U.S.C. 154(b) by 881 days.

(21) Appl. No.: 16/344,820

(22) PCT Filed: Oct. 26, 2017

(86) PCT No.: PCT/IB2017/056648
§ 371 (c)(1),
(2) Date: Apr. 25, 2019

(87) PCT Pub. No.: WO2018/078557
PCT Pub. Date: May 3, 2018

(65) Prior Publication Data
US 2020/0053958 A1    Feb. 20, 2020

(30) Foreign Application Priority Data

Oct. 26, 2016 (JP) .............................. JP2016-209915

(51) Int. Cl.
*A01C 23/04* (2006.01)
*B01F 1/00* (2006.01)
(Continued)

(52) U.S. Cl.
CPC ............ *A01C 23/042* (2013.01); *B01F 21/22* (2022.01); *B01F 25/316* (2022.01);
(Continued)

(58) Field of Classification Search
CPC .. A01C 23/042; B01F 21/22; B01F 25/31241; B01F 25/316; B01F 25/32; B01F 33/813; B01F 35/1453
See application file for complete search history.

(56) References Cited

U.S. PATENT DOCUMENTS 2,546,317 A * 3/1951 Prizer ..................... C02F 1/687
                                                             210/101
3,129,172 A    4/1964 Dickey et al.
(Continued)

FOREIGN PATENT DOCUMENTS

DE    102009026233 A1    2/2011
JP         5444714 A       3/1979
(Continued)

*Primary Examiner* — Donnell A Long
(74) *Attorney, Agent, or Firm* — Hoyng Rokh Monegier B.V.; David P. Owen (57) ABSTRACT

In a fluid injection system for dispensing a solution, said fluid injection system comprises a feeder tank having a product to be dispensed therein, an inlet connection for diverting fluid from a flow line to a fluid nozzle means and an outlet connection for dispensing the solution into the flow line or onto a matter. The fluid nozzle means is in communication with the feeder tank and the inlet connection and the fluid injection system controls a flow rate of fluid at which the fluid nozzle means introduce the fluid into the feeder tank based upon characteristics comprising solubility of the product at a temperature of the fluid in the feeder tank, weight of the product to be dispensed or to be dissolved in the feeder tank, and dispensing time, and the fluid injection system controls a flow rate of the fluid nozzle means to satisfy equation: $F=(W)/(T \times S)$ wherein, F is the flow rate of the fluid nozzle means, W is weight of the product in the feeder tank, T is dispensing time and S is solubility of the product at the temperature of the fluid in the feeder tank.

17 Claims, 4 Drawing Sheets

(51) Int. Cl.
  *B01F 5/04* (2006.01)
  *B01F 13/10* (2006.01)
  *B01F 21/20* (2022.01)
  *B01F 25/32* (2022.01)
  *B01F 25/316* (2022.01)
  *B01F 25/312* (2022.01)
  *B01F 33/81* (2022.01)

(52) U.S. Cl.
  CPC ........ *B01F 25/31241* (2022.01); *B01F 25/32* (2022.01); *B01F 33/813* (2022.01)

(56) References Cited

U.S. PATENT DOCUMENTS

| | | | | |
|---|---|---|---|---|
| 3,595,786 A | * | 7/1971 | Horvath | C02F 1/688 422/282 |
| 4,775,485 A | * | 10/1988 | Etani | C02F 1/003 210/764 |
| 5,775,593 A | * | 7/1998 | Delorme | A01C 23/042 239/318 |
| 8,919,366 B2 | * | 12/2014 | Dunn | B08B 9/0323 137/15.04 |
| 2003/0052192 A1 | | 3/2003 | Kerr | |
| 2004/0094208 A1 | * | 5/2004 | Marsden | A01C 23/042 137/564.5 |
| 2005/0098649 A1 | * | 5/2005 | Thornton | A01C 23/042 239/10 |
| 2006/0059966 A1 | * | 3/2006 | Jordon | B01F 25/31242 71/64.11 |

FOREIGN PATENT DOCUMENTS

| | | |
|---|---|---|
| JP | 63-254930 A1 | 10/1988 |
| JP | 08-389679 A2 | 11/1996 |
| JP | 2007228801 A | 9/2007 |

\* cited by examiner

FLUID INJECTION SYSTEM

FIELD OF THE INVENTION

The present invention generally relates to fluid injection systems and methods, particularly relates to the fluid injection systems and methods for use in fertigation and irrigation.

BACKGROUND ART

The delivery of dissolved nutrients to crops using irrigation water is known as fertigation. Fertigation systems are developed to combine fertilization and irrigation, which is particular important for specific crops and in situations were insufficient (rain) water is provided to plants. In fertigation systems, nutrients such as fertilizers can be added into the irrigation network via various methods such as pressure differential and pump injection.

A by-pass fertilizer tank is operated by the hydraulic pressure in the irrigation system and may not need an external energy source. A pressure differential is created by a pressure regulation in the main irrigation line. The pressure difference drives the water to enter through a by-pass pipe into a reservoir which contains the nutrients, and to go out of the reservoir, carrying varying amounts of dissolved nutrients. This system is loaded with solid state of fertilizers, which can save labor of dissolving solid state of fertilizers in advance. The reservoir in this system needs to be pressure-tight because it uses pressure differential to provide the dissolved nutrients into the irrigation pipe. Therefore, a cast iron or stainless steel tank with corrosion resistant coating is usually used, which makes the system costly. Although this system is simple to install and to operate, the application of nutrients to the crop field using this system is inaccurate and quantitative because, for example, the concentration of nutrients decreases over the irrigation time.

A venturi apparatus is operated also by the hydraulic pressure in the irrigation system and may not need an external energy source, either. The suction by the venturi apparatus is achieved by water passing through a constricted section, resulting in the increased velocity of water flow and a negative pressure, which sucks nutrient solution from an open reservoir tank via a tube mounted in the constricted section. This system must be loaded with liquid state of fertilizers, which needs labor of dissolving solid state of fertilizers in advance. The suction volume of nutrient solution discharged to the crop field using this system depends on the pressure of the main flow line.

Pump injection methods are used to inject a nutrient solution from an open reservoir tank into the irrigation network using electric or hydraulic pump. This system must be loaded with liquid state of fertilizers, which needs labor of dissolving solid state of fertilizers in advance. Whereas these systems can apply proportional nutrients to the crop field, they have complicated designs with a large number of working components which are prone to wear and tear and electric pump needs electric power source to operate.

A fully equipped dosing system is used at greenhouse where electric power is available and frequent irrigation, accurate dosing, multiple nutrient solutions, consistent nutrients ratio and automation are required. The system is typically comprised of indispensable components which are multiple venturi apparatuses with solenoids, booster pump, EC sensor, pH sensor and a computer. The system is very expensive and is not generally used at open-field and orchard where electric power is usually unavailable. In addition, the system is not suitable to be exposed to wind and rain. The system typically needs liquid state of fertilizers for dosing.

US patent publication number US 2012/0195805 describes a system for dissolving solid fertilizer and regulating the level of this material dispensed into the irrigation water. Although the system may indicate an area for improving the fully equipped dosing system mentioned above, its disadvantages mentioned above are not particularly eliminated.

International patent publication WO 2014/108501 also describes a system for dissolving solid fertilizer and regulating the level of this material dispensed into the irrigation water. The system may indicate an area for improving the by-pass fertilizer tank as mentioned above. However, costly material still is needed for the pressure-tight structure.

Conventional fluid injections systems and methods used in fertigation regularly show precipitation of fertilizers in the tank, in particular, when two or more fertilizers are mixed in one tank. Once dissolved in water, components of mixture of fertilizers may react with each other and provide water-insoluble materials that precipitate from the solution at different rates. Precipitation in the reservoir of the fluid injection systems results in clogging the equipment, a reduction in the efficiency of water, a reduction in nutrients yield and quality, and creates non-uniform fertilizer mix delivery to the crops.

Although there are advantages and disadvantages to any conventional fluid injection system, there isn't an economical and simple system which can deliver nutrients to the crop field accurately, in particular, when electricity is unavailable, the system is exposed to wind and rain and solid fertilizers are preferable to load with. Such a situation is very common to most of crop fields. Less working components the system has, more durable and lower-maintenance it becomes.

Thus, there is an existing need in the nutrients delivery field for economical and simple to operate and to install fluid injection systems, which overcome the disadvantages mentioned above.

In particular, it is desirable to design a fluid injection system that reduces or prevents precipitation of solid product (e.g. fertilizer) or mixture of solid products in the feeder tank within a desired fertigation period.

It is desirable to design a fluid injection system that can be loaded with multiple solid products (e.g. fertilizers) respectively in the multiple feeder tanks.

It is also desirable to design a fluid injection system that can continue to dispense substantially saturated solution of a solid product or mixture of solid products from the feeder tank or the feeder tanks for users to know concentration of the solution, optionally, without using any sensor means proportionally within a desired fertigation period.

It is also desirable to design a fluid injection system that can continue to dispense a solution of different solid products, where the products are substantially saturated, proportionally within a desired fertigation time.

It is also desirable to design a fluid injection system that enables users to forecast the irrigation time needed to dissolve a given amount of a solid product or mixture of solid products in the feeder tank by continuing to dispense the substantially saturated solution of the product, optionally, without using any sensor means.

It is also desirable to design a fluid injection system that enables users to forecast the irrigation time needed to dissolve given amounts of multiple products in the feeder tanks and to continue dispensing the substantially saturated solution of the products at consistent ratio of nutrients, optionally, without using any sensor means.

It is also desirable to design a fluid injection system that can be operated by hydraulic power.

It is also desirable to design a fluid injection system that can be composed of less working components.

It is also desirable to design a fluid injection system that may not require a pressure-tight structure for the reservoir tank.

It is also desirable to design a fluid injection system that can be operated without the necessity of using a computer.

The present invention provides such fluid injection systems and methods that solve one or more of the problems mentioned above. Other features and advantages of the invention will be apparent from the following description and from the claims.

BRIEF DESCRIPTION OF THE DRAWINGS

The features and advantages of the invention will be appreciated upon reference to the following drawings, in which.

DESCRIPTION OF ILLUSTRATIVE EMBODIMENTS

In one aspect of the present invention, a fluid injection system for dispensing a solution is provided.

In one embodiment, the fluid injection system according to the present invention comprises a feeder tank having a product to be dispensed therein; an inlet connection for diverting fluid from a flow line to a fluid nozzle means; an outlet connection for dispensing the solution; wherein the fluid nozzle means is in communication with the feeder tank and the inlet connection for introducing fluid into said feeder tank; wherein the fluid nozzle means is designed, configured, programmed, and/or controlled to introduce the fluid into the feeder tank at a flow rate of fluid predetermined based upon characteristics comprising solubility of the product at a temperature, weight of the product to be dispensed or to be dissolved in the feeder tank, and dispensing time.

As used herein, the term "similar solubility" or "similar products" or "similar fertilizers" and the like refers to two or more products, where their solubility differences at a given temperature is less than 10%. For example, referring to table 1, at 20° C. the solubility of MAP is 295 g/l and solubility of KCl is 310 g/l, thus they are considered to be similar products.

The term "different" or "different fertilizers" or "different products" and the like refers to products that are not similar as defined above.

As used herein, the term "solution" refers to a product or mixture of two or more similar products substantially saturated in a fluid medium or a solvent such as water.

As used herein, the term "substantially saturated" refers to a state of solution where the concentration of the dissolved product is near the solubility point. Of course it can also refer to a mixture of two or more products than could be dissolved in a solvent under particular physical conditions such as temperature. "Substantially saturated" is therefore taken to mean a state of a solution just prior to the point at which the dissolved product or dissolved mixture of two or more similar products will precipitate out of the solution under the defined physical conditions following the dissolution of as much of the product or mixture of two or more similar products as could be dissolved by a solvent. "Substantially saturated" means that more than 80%, preferably over 90%, and more preferably over 95%, and most preferably over 99% of the solubility of a product or a mixture of products is reached.

The term "a product" used herein may also include mixture or blend of two or more similar products. The product of present invention can be selected from fertilizers, pesticides, wetting agents or other plant growth-, health-, proliferation- or development-enhancing products, minerals, chemicals, salts, or any combination thereof. The fertilizers can be selected from water-soluble fertilizers, in particular, containing any macronutrient such as nitrogen, phosphorous or potassium. In one embodiment, the fertilizers of present invention are soluble fertilizers such as urea, ammonium sulphate (AS), monoammonium phosphate (MAP), diammonium phosphate (DAP), monopotassium phosphate (MKP), magphos, ammonium nitrate, potassium chloride (KCl), potassium sulphate and potassium nitrate. The "product" or "products" of present invention refers to solid, powder, granule, and/or tablet forms used in treatment of the matter. For example, the product of present invention placed into a feeder tank is not a concentrated liquid fertilizer. Placing liquid fertilizers into a feeder tank has disadvantages that more fertilizers need to be transported, and/or larger feeder tanks need to be used.

As used herein, the term "matter", "matters", and the like refers to any living or growing vegetation, foliage, trees, plants, crops such as rice, shrubs, weeds, grass, fungi and insects. In addition, the term "matter" herein includes irrigation fields. In one embodiment, the matter is a rice field, optionally, a 0.3-1.5 hectare rice filed.

As used herein, the term "treatment of a matter", "treating the matter", and the like includes promoting growth or yield, fertilization, nutrient feeding, insect control, pesticide-, herbicide-, bactericide-, fungicide-application, and improving or altering ornamental or appearance of the matter.

As used herein, the term "water-soluble" refers to a product that is capable of being dissolved in a given amount of water at a given physical condition such as temperature. Generally, the term "water-soluble" refers to a partially or completely dissolved form. For example, a product or mixture of similar products (e.g. fertilizer(s)) can be present in dissolved form, wherein it is dissolved to an amount of over 80%, preferably over 90%, and more preferably over 95%, and most preferably over 99%. Optionally, the product or mixture of the products is 100% dissolved.

The term "in communication with" encompasses a physical connection that may be direct or indirect through another material or layer between one component of the system and another. For example, the inlet connection and the fluid nozzle means of present invention are designed to be in communication with each other.

As used herein, the term "solubility" refers to the maximum amount of a product of present invention that can be dissolved in a given quantity of fluid such as water at a given temperature. For example, the measure of solubility of a product at a given temperature is how many grams of the product can be dissolved in each 100 g of the specific fluid to form a saturated solution.

The term "proportional" or "proportionally" refers to a particular method of applying fertigation. A constant predetermined ratio between the volume of the irrigation water and the volume of the fertilizer solution is maintained throughout the fertigation time, resulting in a constant nutrient concentration in the irrigation water.

The term "quantitative" or quantitatively" refers to another a particular method of applying fertigation. In this method, a predetermined amount of fertilizer is injected into the main flow line. The ratio between the volume of the irrigation water and the injected volume of the fertilizer solution can vary and thus the concentration of the nutrients in the water can vary over the fertigation time.

The term "consistent ratio of nutrients" refers to multiple nutrient solutions to be dispensed at the same time in a predetermined ratio. When ratios between the volume of the irrigation water and the volume of two or more nutrient solutions are maintained at a constant level a "consistent ratio of nutrients" is obtained.

As used herein, the term "flow rate" includes the ability of the programmed, controlled, designed, or configured fluid nozzle means according to the present invention to maintain a preselected setpoint flow rate over time, with a relatively small plus or minus variance from the exact set point flow rate, e.g., plus or minus 1-10%. For example, the flow rate of 10 liter per hour includes +/−10% of 10, or from 9 liter/hour to 11 liter per hour. The preselected setpoint flow rate is determined based upon characteristics comprising solubility of a product at a temperature, weight of a product to be dispensed or to be dissolved in the feeder tank, and dispensing time.

The terms "dispensing time", "operation time", "irrigation time", "fertigation time" or the like are used interchangeably and refer to the designated period of time for dispensing the solution out of the feeder tank, in particular, from the feeder tank into the flow line or onto the matter; or dispensing the diluted solution from the dilution tank onto the matter or dispensing the solution joined or diverted to the fluid of the flow line onto the matter. For example, In one embodiment, the dispensing time of present invention is 2-4 hours.

As used herein, the term "fluid nozzle means" refers to any fluid dispersement means (e.g. a device) such as one, two or more spray-, sprinkler-, or fogger-systems and devices.

The fluid nozzle means of present invention is programmed, designed, configured, monitored, controlled, and/or adjusted to introduce the fluid into the feeder tank at a flow rate of fluid determined based upon characteristics comprising the solubility of a product at a temperature, weight of a product to be dispensed or dissolved in the feeder tank, and dispensing time. Thereby, users of the fluid injection system of present invention are able to forecast dispensing time and/or the quantity (e.g. weight) of the product needed in order to continue dispensing the substantially saturated solution of the product.

In further embodiment, the fluid nozzle means (e.g. flow-regulated fogger or equivalents) emits fluids (e.g. fine mist or droplets of water at a predetermined flow rate) from the flow line onto the product (e.g. solid single water soluble fertilizer or mixture of two or more similar solid water soluble fertilizer enclosed in the feeder tank). In one embodiment, the fluid nozzle means works based on fluid (e.g. water) pressure of the flow line.

In further embodiment, the flow rate of fluid nozzle means of present invention is programmed, configured, monitored, controlled and/or adjusted during the operation of the system, in particular, during fertigation time. For example, solubility of a product may change depending on various factors such as change in the pH and temperature of the fluid and ambient temperature during operation time. In such cases, the flow rate of fluid nozzle means is adjusted based upon the change in solubility of a product. In further embodiment, said flow rate is predetermined before the fluid is introduced onto the product.

In one embodiment, the fluid nozzle means of present invention accordingly to any of the preceding embodiments is programmed, monitored, controlled, designed and/or configured to have a flow rate determined by equation 1:

$$F=(W)/(T\times S)$$

Wherein,
F is the flow rate of the fluid nozzle means;
W is weight of the product in the feeder tank or the weight of the product to be dissolved;
T is dispensing time; and
S is solubility of the product at a temperature.

For example, 50 Kg (W) of Ammonium sulphate having 754 gram/liter solubility in water at 20° C. (S) is enclosed in a feeder tank. The desired fertigation time is 2 hours (T). Based on the equation 1, a fluid nozzle means (e.g. a fogger system) is programmed, monitored, and/or designed to have a flow rate of 33.2 liter per hour to dissolve 50 Kg of Ammonium sulphate continuously during two hours.

In one embodiment, the number of fluid nozzle means (e.g. one, two, three, four, five, six, seven, or more foggers, sprayer, sprinklers) of present invention and their flow rates is adjusted to ascertain that required amount of fluid is delivered onto the product in order to dissolve a given amount of the product in the tank by continuing to dispense the substantially saturated solution of the product. The fluid nozzle means of present invention may include one or two or more nozzle means to introduce the fluid onto the product in the feeder tank as long as the flow rate of the sum of the nozzle means corresponds to the F value determined according to the equation 1. For example, as calculated above, the fluid nozzle means (e.g. a fogger) of the system is designed to have a flow rate of 33.2 liter per hour. One fogger having a flow rate of 33.2 liter/hour or two foggers each having a 16.6 liter/hour flow rate or three foggers each having 11.1 liter/hour are used in order to dissolve 50 Kg Ammonium sulphate continuously during two hours.

In further embodiment, the fluid nozzle means of present invention are driven hydraulically.

Figure 1:
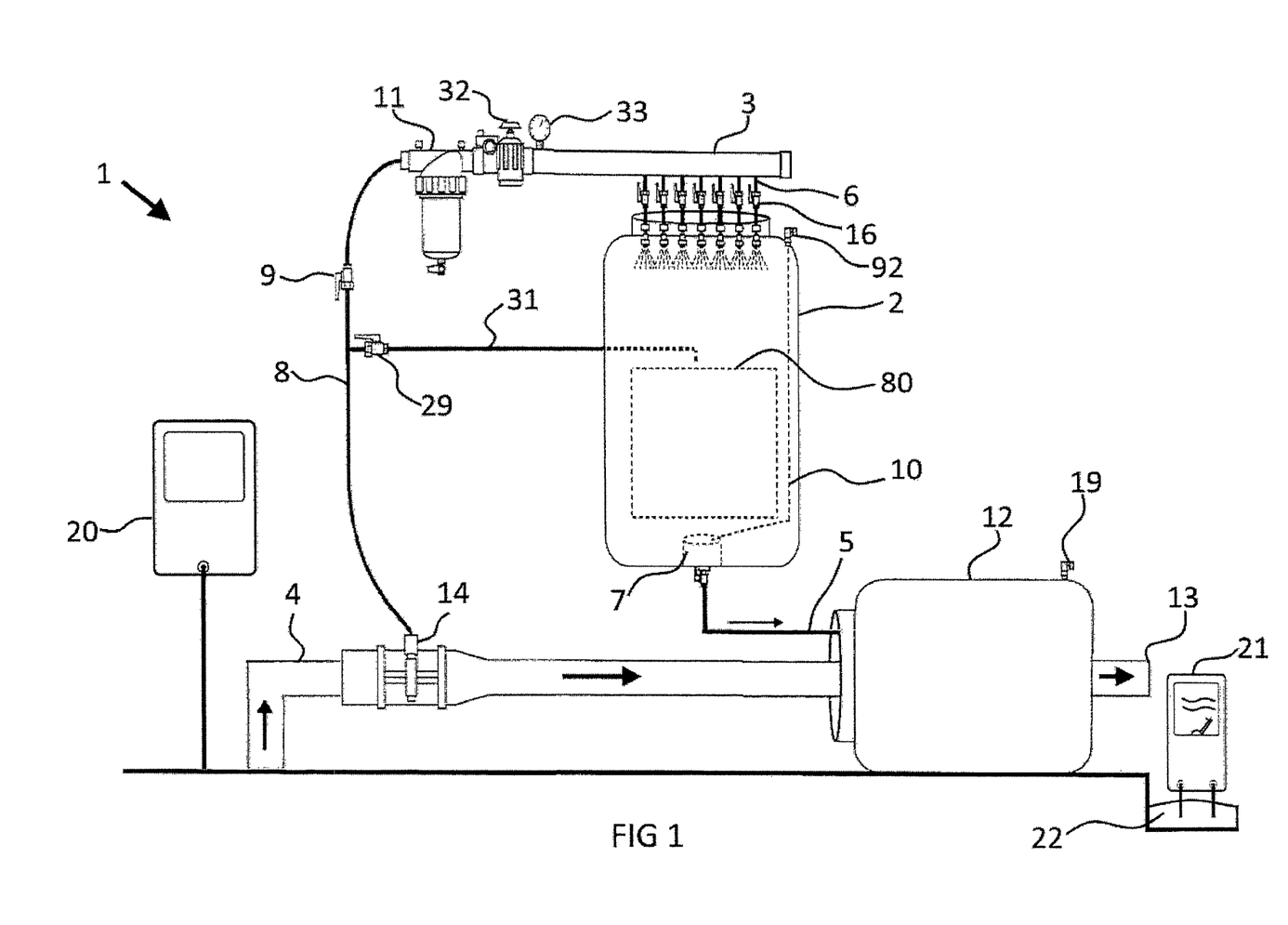
FIG. 1 is a side view of the fluid injection system according to one embodiment.

In further embodiment, referring to FIG. 1, the fluid nozzle means (6) is located at the upper end of the feeder tank (2) over the product (80). The fluid nozzle means (6) is connected to the inlet connection (3) to introduce fluid onto the product. As the fluid is dispensed onto the product by the fluid nozzle means (6) having a flow rate specifically calculated for the specific product and desired operation time, the fluid dissolves the product and the fluid containing the dissolved product passes through the outlet connection (5). Optionally, the fluid nozzle means (6) includes a valve (16) to control, close or open the flow of the fluid through (6) and onto the product.

As used herein, the term "feeder tank", "tank", and the like refers to any rigid or semi-rigid tank for receiving and storing the product and for dispensing a solution of the present invention. Other synonymous to a feeder tank are tank, container, drum, reservoir, and the like. The feeder tank of present invention can have any size, shape, and capacity and can made of any material, optionally, non-corrosive material such as stainless steel, plastic resin, in particular, PE (polyethylene) or PVC. In one embodiment, the feeder tank of present invention is a 60 L UN Plastic Drum. Optionally, the feeder tank can be flexible such as a bag. In one embodiment, the feeder tank comprises a heat control layer (e.g. electronic heat jacket) to control and adjust the temperature inside the feeder tank. In one embodiment, the feeder tank is air-tight, i.e. it is sealed off to prevent air to enter the tank and in another embodiment, the feeder tank is not air-tight, for example, the top side of the feeder tank toward the fluid nozzle means is open to the ambient pressure.

As used herein, the term "inlet connection" or "inlet" refers to a means (e.g., a device) for introducing the fluid such as water to the fluid nozzle means and/or into the feeder tank. In one embodiment, the inlet connection introduces fluid (e.g. water) having a flow rate determined according to the present invention, for example, equation 1, from an outside source (e.g. a main flow pipe) to the feeder tank. In another embodiment, the inlet connection introduces fluid from an outside source such a the flow line to the feeder tank through the fluid nozzle means of present invention. In one embodiment, the inlet is a separate component from the fluid nozzle means. In one embodiment the inlet is in the form of a tube and/or pipe. Optionally, the inlet is made of any material, optionally, a non-corrosive material. Optionally, the inlet is made of PE or PVC.

In further embodiment, referring to FIG. 1, the inlet connection (3) is a by-pass pipe from the main flow pipe (4) delivering water into the feeder tank (2) which contains the product via the fluid nozzle means (6). Optionally, the inlet connection (3) includes a pump (14) to drive the fluid from the main flow line into the feeder tank via the fluid nozzle means (6). In further embodiment, the inlet connection (3) includes a fluid tube (8) that is connected to the main flow line (4). In further embodiment, the inlet connection (3) includes a filter (11), a pressure reducing valve (32), and/or a pressure gauge (33).

As used herein, the term "outlet connection" or "outlet" refers to a means (e.g., a device) where fluid such as water exits the feeder tank. In one embodiment, the outlet is a separate component from the feeder tank. In one embodiment, the major axis of outlet is oriented perpendicular to the major axis of the feeder tank. In another embodiment, the major axis of outlet is oriented parallel to the major axis of the feeder tank. In one embodiment the outlet is in the form of a tube. In another embodiment, the outlet is in the form of a pipe. Optionally, the outlet is made of any material, optionally, any non-corrosive material. Optionally, the outlet is a PVC pipe.

In one embodiment, the feeder tank (2) and the outlet connection (5) are positioned at a higher elevation than the main flow pipe (4) as shown in FIG. 1. In further embodiment, the outlet connection (5) is designed to dispense the solution into the flow line (4) or onto a matter (22) by gravity.

According to another embodiment of present invention, the fluid injection system according to any of the preceding embodiments further comprises a filter designed to prevent a product from entering said outlet connection. In one embodiment, the filter is located at the base of the feeder tank. FIG. 1 depicts the feeder tank (2) of the fluid injection system of present invention comprises a filter (7) located at the base of the feeder tank (2).

Figure 4:
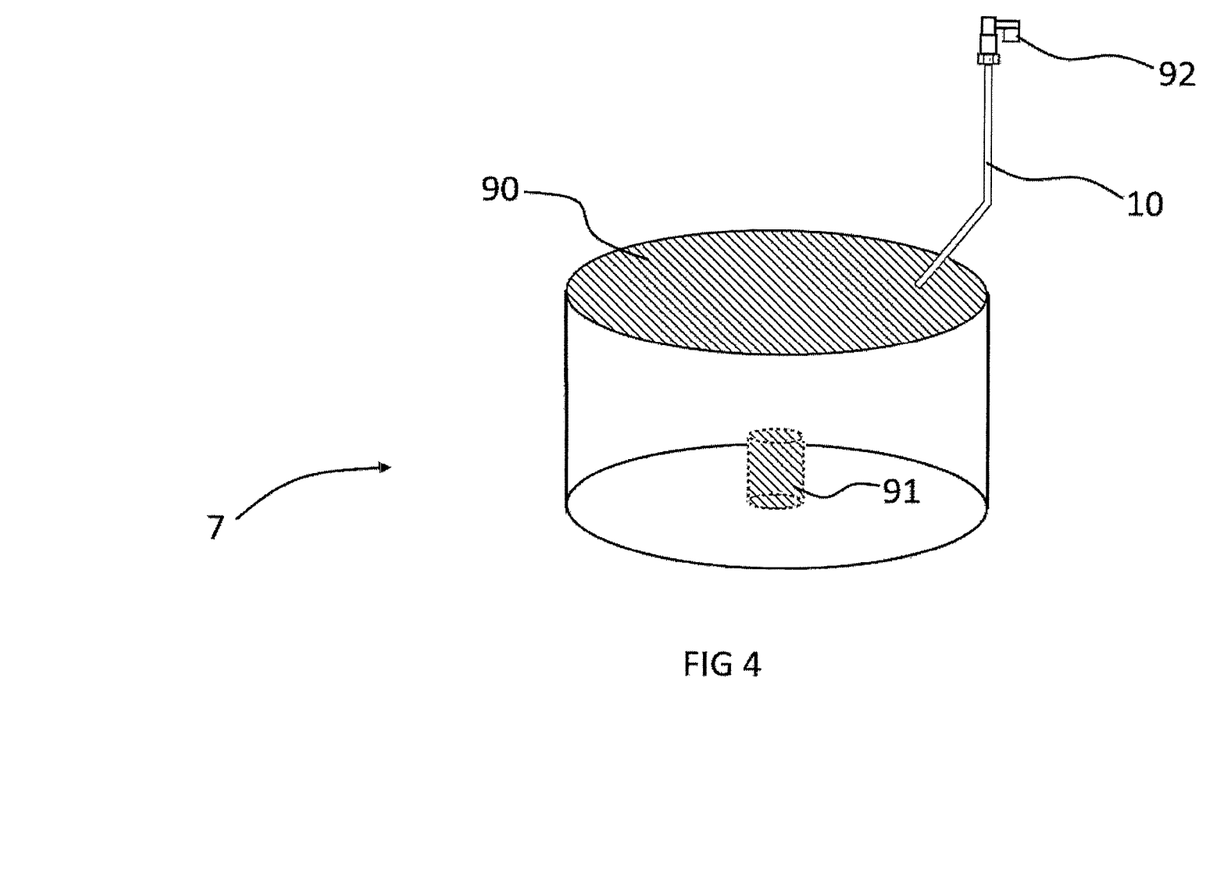
FIG. 4 shows the filter (7) of present invention.

Referring to FIG. 4, in one embodiment, the filter comprises a top cover (90) designed to prevent drainage of a solution not having a desired saturation level from the feeder tank.

In further embodiment, the fluid injection system of present invention comprises an external air intake valve placed outside of the feeder tank, which is in communication with the filter inside the feeder tank via an air intake tube. The external air intake valve of present invention is designed to suction the external air onto or into the filter to prevent the solution to be stacked and to prevent clogging of the filter. FIG. 1-4 show an external air intake valve (92) placed outside of the feeder tank (2), which draws the external air via an air intake tube (10) into or onto the filter placed inside the feeder tank (2). The external air intake valve (92) is in communication with the filter (7) inside the tank via an air intake tube (10).

According to another embodiment, the filter of present invention comprises an overflow pipe, which extends into the filter inside the tank. The overflow pipe (91) as depicted in FIG. 4 inside the filter prevents the solution to be outflowed from the tank without having a desired saturation level. By keeping the fluid at the bottom of the feeder tank under the apex of the overflow pipe, the contact area and time between the fluid and the product is increased and thereby a solution with a desired saturation level exits the feeder tank into the outlet connection to be dispensed into the flow line or onto the matter.

In one embodiment, the height of the overflow pipe is less than the height of the filter. In further embodiment, inside diameter of the overflow pipe is designed in order for the flow rate of the sum of the nozzle means to pass through continuously, without a delay. In further embodiment, the overflow pipe and the outlet connection are one-piece conduit or pipe. In further embodiment, the overflow pipe and the outlet connection are two piece conduits or pipes that are designed to be placed in communication with each other. In further embodiment, the overflow pipe is integrated into the filter as one piece or the overflow pipe can be removed or replaced from the filter.

According to another embodiment of present invention, the fluid injection system according to any of the preceding embodiments further comprises a dilution tank in communication with the flow line and the dispensed solution from the outlet connection. This system can, for example, be used for unpressurized irrigation like surface irrigation or flood irrigation.

As used herein, the term "dilution tank" refers to any rigid or semi-rigid tank designed for receiving and storing the solution existed from the feeder tank via the outlet connection and for receiving and storing the fluid (e.g. water) from the main flow line. Other synonymous to a dilution tank are intermediate- or mixing-tank, container, drum, reservoir, and the like. In one embodiment, the size and capacity of dilution tank of present invention is configured to discharge water pressure in main flow line to atmosphere pressure. The dilution tank of present invention can have any shape and can be made of any material, optionally, non-corrosive material such as PE (polyethylene) or PVC. In one embodiment, the dilution tank of present invention is a 120 L UN Plastic Drum. Optionally, the feeder tank can be flexible such as a bag.

The dilution tank of present invention can be used for intermediately storing the solution (i.e. the dissolved product) exited the feeder tank via the outlet connection and mixing said solution with the fluid of the flow line to create a diluted solution.

The combination of the dilution tank with the feeder tank and the main flow line provides a higher homogeneity between the product and the fluid. Furthermore, the dilution tank can accumulate the solution exited from the feeder tank in order to obtain a diluted solution having a desired saturation level to be dispensed onto a matter.

As shown in FIG. 1, in one embodiment, the dilution tank (12) of present invention is disposed at lower elevation, below the base of the feeder tank (2), whereby the solution existed from the feeder tank via the outlet communication is directed to the dilution tank by gravity.

In further embodiment, the dilution tank of present invention comprises a dispensing outlet for dispensing the diluted solution, for example, onto a matter.

In further embodiment, as depicted in FIG. 1, the dispensing outlet (13) is disposed at a higher elevation than the matter, whereby the solution is dispersed onto the matter via gravity. In one embodiment, the inner diameter of the dispensing outlet of the dilution tank is larger than that of main flow line to maintain atmosphere pressure in the dilution tank. The inner diameter of the outlet communication of the dilution tank is smaller than that of dilution tank to create turbulence flow which provides a higher homogeneity between the product and the fluid in the dilution tank. Optionally, an air release valve (19) can be mounted on the dilution tank to further a discharge of water pressure in main flow line to atmosphere pressure.

In further embodiment, pump(s) for directing the fluid into the fluid nozzle means (6), for directing the diluted solution onto the matter, for directing the solution exited from the feeder tank (2) to the dilution tank (12), and/or for directing the diluted solution exited from the dilution tank is provided.

In another embodiment, to get hydraulic pressure from non-pressurized water source, the fluid (e.g. water) form the fluid source (e.g. open canal) is pumped by, for example, an engine energized by, for example, electricity, solar power, wind power or fossil fuel, to the fluid nozzle means.

In one embodiment, the fluid injection system of present invention does not have any pumps to evacuate the solution from the feeder tank. FIG. 1 depicts that the solution is exiting the feeder tank via gravity. This way the disadvantages of using pumps to draw the solution outside of the feeder tank as mentioned above is avoided. In further embodiment, the fluid injection system of present invention does not have any pumps for directing fluids into the dilution tank (12), nor for directing the exited solution or diluted solution into or onto the matter. In this embodiment, the fluid is directed via gravity force, for example.

In one embodiment, the fluid injection system of present invention provides the solution (e.g. saturated aqueous solution of any water-soluble fertilizer) at stable and continuous dispensing rate by gravity from feeder tank which is located at higher position than the flow line, to the matter (e.g. surface irrigated field). In one embodiment, the fluid and solution join together (e.g. join in the flow line, matter, or dilution tank) from the same pressurized fluid source.

In another embodiment, referring to FIGS. 1-3, the fluid injection system of present invention includes further a flush line (31) in fluid communication with the inlet connection (3) or the fluid tube (8) and the feeder tank (2) to provide fluid into the feeder tank. The flush line (31) is used to wash out residue of a product (e.g. fertilizer) which was not dissolved completely after a certain dispensing time. The flush line (31), optionally, includes a valve (29) to close or open the communication line (31).

In one embodiment, the flush line provides fluid from the fluid source or flow line to the feeder tank to wash out the product (e.g. fertilizers) and further it can provide fluid in the feeder tank before start dispensing liquid from the fluid nozzle means into the tank. For example, the flush line can provide water (e.g. 10 cm) in the feeder tank before start dispensing water from the fluid nozzle means in order to compensate the gap of no dispensing period at the beginning of the operation of the system due to the overflow pipe of present invention. For example, it may take 3-5 minutes until the solution can overflow the overflow pipe having height of 10 cm in order to be dispensed into the flow line or onto the matter. The flush line of present invention will reduce the time needed to have the solution exited from the feeder tank.

In one embodiment, the fluid injection system of present invention comprises at least one sensing means designed to detect at least one factor comprising solubility of the product, weight of the product, concentration of the solution, concentration of diluted solution, fluid level in the irrigation field, a temperature of the fluid, a temperature of the solution, an electric conductivity of the solution or diluted solution, and any combination thereof.

In one embodiment, the fluid injection system of present invention further comprises a sensing means, (e.g. water level sensor) placed in the matter. In one embodiment, the sensing means is placed in the irrigation filed such as rice field. In one embodiment, referring to FIGS. 1-3, the sensing means (21) detects the fluid level or height or depth in the matter (22) (e.g. the irrigation filed) and sends signal to a control panel (20) when water level reaches predefined level. Optionally, the signal is communicated with the control panel electronically or wirelessly. The control device upon receiving the signal from the sensor reduces or stops the fluid from the flow line or fluid source via a control valve. In one embodiment, the fluid injection system of present invention dispenses fluid onto the matter until the fluid level reaches 5-10 cm. Reaching beyond this level causes the fluid level sensor to send a signal to the control panel to reduce or stop the fluid from the flow line or fluid source via a control valve.

In further embodiment, the fluid injection system of present invention comprises a sensor means, which is a fluid (e.g. water) meter. Fluid meters can detect flowing fluid volume. Electronic signal goes from fluid meter to the control panel, for example, every m3 or L. When the control panel receives the signal, it calculates degree of concentration. If the concentration is higher than preset value, the control panel commands the control valve to increase flow of fluid from the flow line or fluid source. If the concentration is lower than preset value, the control panel commands the main control valve to reduce flow of water. The fluid meter of present invention in one embodiment is placed in the outlet connection, dilution outlet (13), at or after the solution is rejoined with the fluid of the flow line or fluid source, or in the matter such as irrigation field including rice field or any combination thereof. Optionally, the flow meters can be used to manage the flows and concentrations.

In further embodiment, the fluid injection system of present invention further comprises an electrical conductivity (EC) sensor. EC sensor can measure the total product dissolved in the solution. When the control panel receives the signal from the EC sensor, it calculates degree of concentration. If the concentration is lower than preset value, the control panel commands the control valve to reduce or to shut off flow of water temporarily. In one embodiment, the EC sensor is placed in the outlet connection, dilution outlet (13), at or after the solution is rejoined with the fluid of the flow line or fluid source, or in the matter such as irrigation filed including rice field, or any combination thereof.

In one embodiment, the fluid injection system of present invention further comprises a programmable control panel designed to control, adjust, regulate and/or monitor flow rate of fluid nozzle means and/or to control, adjust, regulate and/or monitor dispensing or duration of dispensing of the solution, the diluted solution, and/or the fluid from the flow line or fluid source based upon received data.

For example, the characteristics of the product to be dispensed or to be dissolved in the feeder tank are inputted into the control device. The characteristics comprise solubility of a product at a temperature, weight of a product to be dispensed or to be dissolved in the feeder tank, and dispending time. Other characteristics such as PH of fluid, desired concentration, fluid level to be dispensed onto the matter can also be inputted in the control device. Based on the inputted data the control device of present invention is specifically programmed to adjust the flow rate of the fluid directed ultimately into the feeder tank for a particular product. In one embodiment, the control device of present invention calculates and determines the flow rate based on the equation 1 and adjusts, controls, and monitors the fluid nozzle means to have the determined flow rates.

In one embodiment, the control panel is replaced by server application which is connected by internet.

The sensing means (e.g. devices) like fluid level sensor, flow meter and/or EC sensor send signals (e.g. wirelessly, electronically) to the control panel and/or to a server application such as a receiver/transmitter (e.g. computer, hand held device), which is connected wirelessly to internet. The server application and/or the control device command the system, for example, any control valve placed on any part of the system based upon the received data to on/off or to increase/decrease dispensing the solution, diluted solution, and/or the fluid from the flow line and/or to control, adjust, regulate and/or monitor flow rate of fluid nozzle means. In one embodiment, the control panel and/or the transmitter controls the frequency and duration of fertigation via the system of present invention. In one embodiment, the fertigation frequency is every week or every 3-5 days or every day.

In one embodiment, the fluid injection system of present invention further comprises one or more liquid dosing tank, not shown. The liquid dosing tank provides additional liquid form of nutrients, micro elements, surfactant and/or agrochemicals to the system of present invention. In one embodiment, the liquid dosing tank is connected to the dilution tank and the additional liquid is fed by gravity into the dilution tank.

Figure 2:
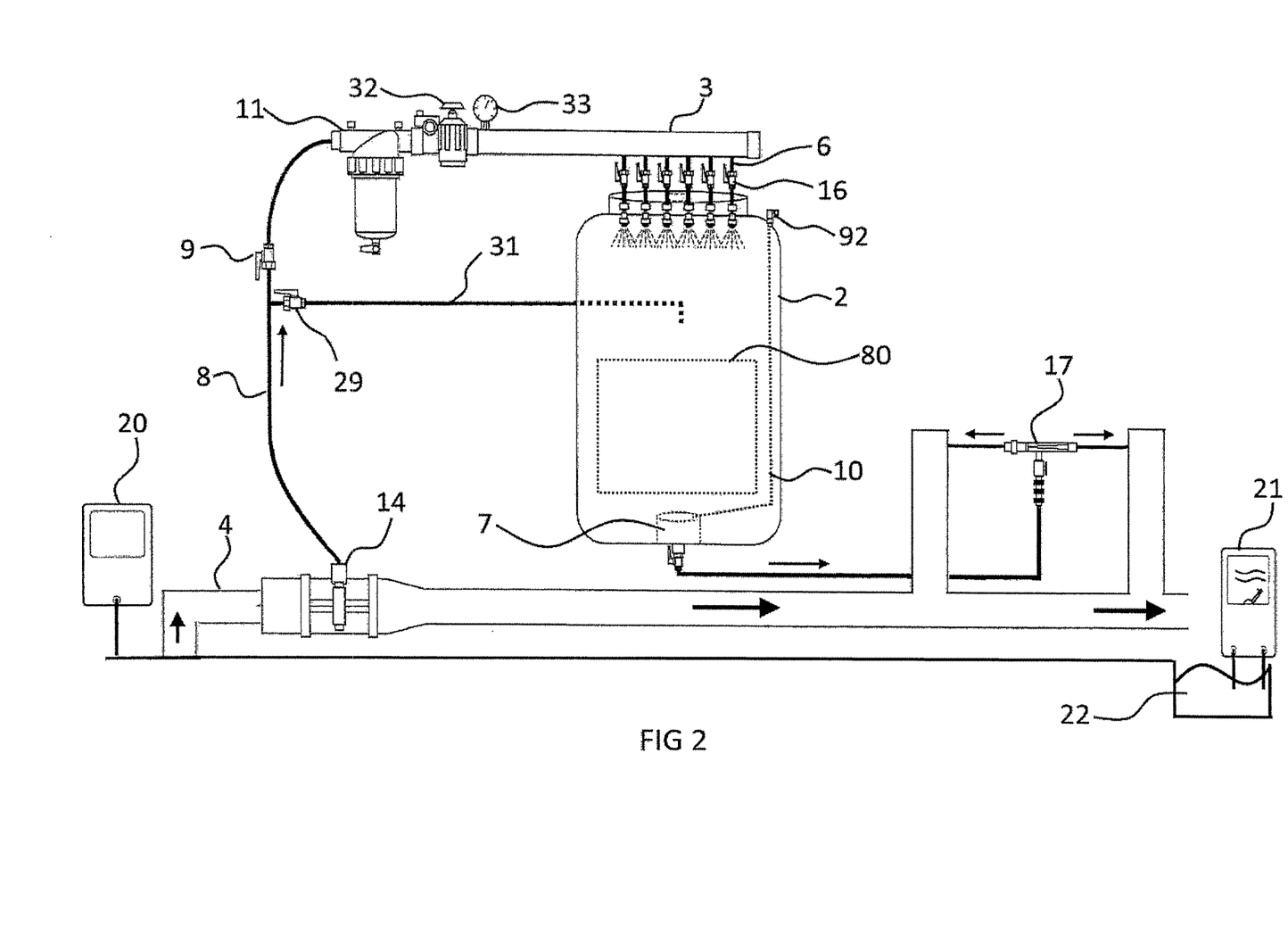
FIG. 2 is a side view of the fluid injection system according to another embodiment having a venturi injector (17)
Figure 3:
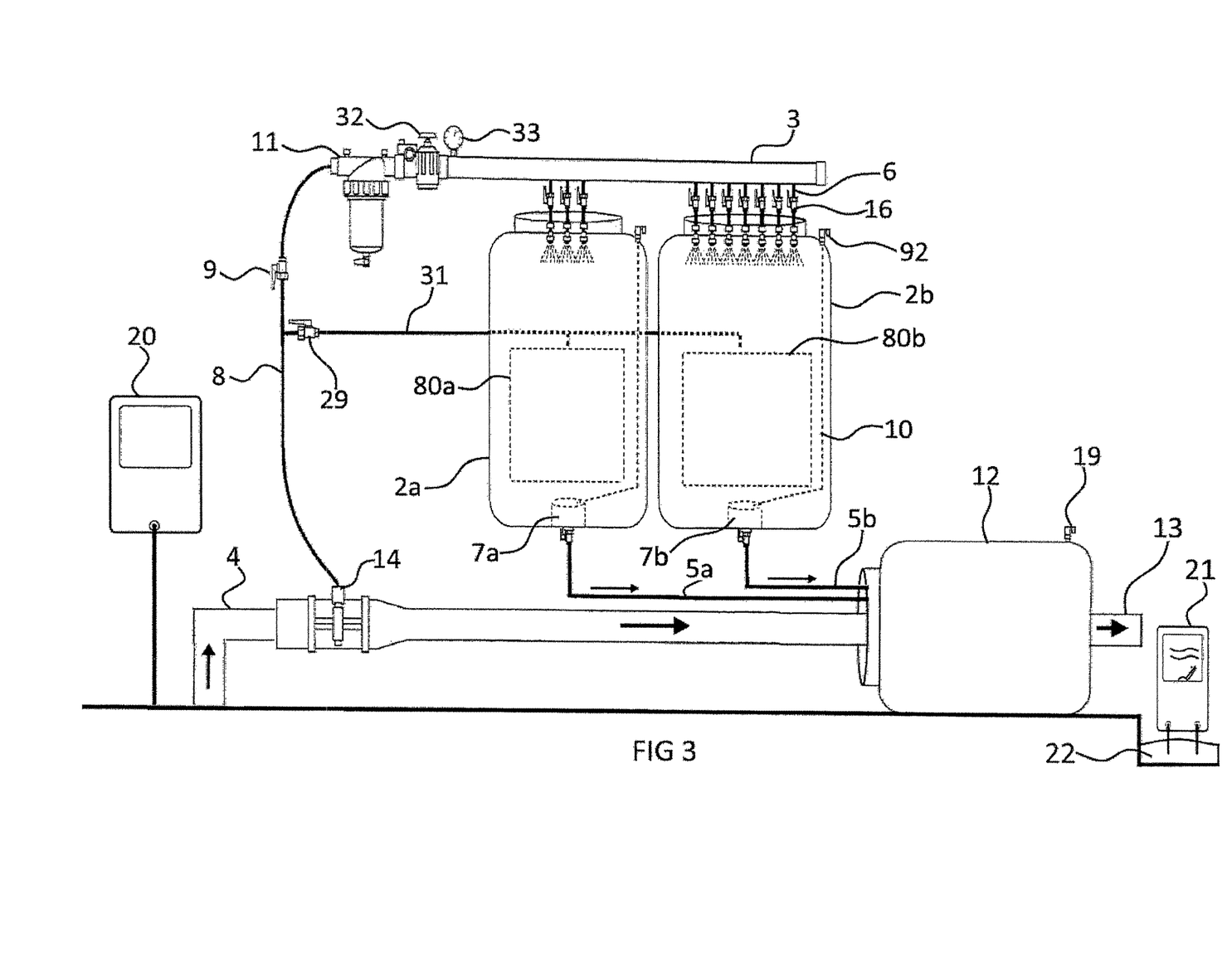
FIG. 3 is a side view of the fluid injection system having two feeder tanks.

In another embodiment, the fluid injection system of present invention comprises an injector, for example, a venturi injector in communication with the outline connection according to any of the preceding embodiments. The injectors, in particular, the venturi injectors used in the present invention are known. As depicted in FIG. 2, the system of present invention uses a venturi injector (17) to cause a negative pressure (vacuum) that sucks the solution from the outlet communication into the main flow line 4 or onto the matter.

Combined with venturi injector, the fluid injection system of present invention synchronizes irrigation and fertilization (=fertigation), which means higher homogeneity between the product and the fluid. The solution of present invention is injected at a stable and continuous dispensing rate by gravity from feeder tank via the outlet connection and then fed solution is suctioned by the venturi injector into the pressurized main water line. This system can, for example, be used for pressurized irrigation like drip irrigation and sprinkler irrigation, and also for unpressurized irrigation like surface irrigation and flood irrigation.

In another aspect of the present invention, a fluid injection system having at least two feeder tanks is provided. All of the preceding embodiments apply to this embodiment and are incorporated by reference in their entireties. The fluid injection system comprising at least two feeder tanks, each of which having a product to be dispensed therein and is in communication with a fluid nozzle means and the fluid nozzle means of each tank is in communication with the same inlet connection or, optionally, separate inlet connection. The fluid nozzle means of each tank is designed, controlled, adjusted, programmed, configured to introduce fluid into the feeder tank at a flow rate of fluid determined based upon characteristics comprising solubility of the product at a temperature and weight of the product to be dispensed or to be dissolved in the feeder tank, and dispensing time.

In one embodiment, the fluid nozzle means of each feeder tank according to any of the preceding embodiments is programmed, controlled, designed and/or configured to have a flow rate determined by the above equation 1.

In one embodiment, the fluid nozzle means of each tank is in communication with the same inlet connection of present invention. In further embodiment, the fluid nozzle means of each tank have different inlet connections for introducing the fluid from the fluid source or the flow line into the feeder tank. In further embodiment, the outlet connection of each feeder tank dispenses the solution into the flow line or the dilution tank or onto the matter.

In further embodiment, the fluid injection system of present invention comprises at least two feeder tanks, each of which contains a different product.

The solubility of nutrients such as fertilizers may be reduced when two or more different fertilizers are mixed together. Mixing similar fertilizers in one tank or using two or more feeder tanks each having similar fertilizers allows to separate products having different solubility at a given temperature in order to prevent precipitation and clogging.

Table 1 shows examples of fertilizers' solubility and temperature according to the present invention.

TABLE 1

| Temperature | Urea | AS | MAP | DAP | MKP | Magphos | KCL |
| --- | --- | --- | --- | --- | --- | --- | --- |
| 10° C. | 680 g/L | 706 g/l | 227 g/l | 429 g/l | 142 g/l | | 280 g/l |
| 20° C. | 850 g/l | 730 g/l | 295 g/l | 628 g/l | 178 g/l | | 310/l |
| 30° C. | 1080 g/l | 750 g/l | 374 g/l | 692 g/l | 225 g/l | 400 g/l | 340 g/l |

As shown in Table 1, urea has higher solubility at given temperatures than PK (phosphorus, potassium) fertilizers. Thus, in one embodiment, the urea is placed in a different feeder tank from the PK feeder tank. In further embodiment, AS has higher solubility at given temperatures than PK fertilizers and accordingly is placed in a different feeder tank from PK feeder tank. In further embodiment, MAP and KCL have similar solubility at given temperatures, thus they can be placed in one feeder tank together. In further embodiment, since solubility of Magphos and MAP is similar to one another, they may be enclosed in one feeder tank. In further embodiment, DAP and MKP are not in the same feeder tank as KCl, since the solubility of DAP is higher and the solubility of MKP is lower than solubility of KCl in order to be considered as similar according to present invention. In further embodiment, AS and KCl are not placed in one feeder tank because the blended fertilizers would cause precipitation of potassium sulphate which solubility is the lowest among major water soluble fertilizers. In further embodiment, MAP and KCl or Magphos and MAP are placed in one feeder tank.

For example, the fluid injection system of present invention having two feeder tanks is provided. The desired fertigation time (Z) is two hours. In one feeder tank, 50 Kg (B) of Ammonium sulphate having 754 gram/liter solubility in water at 20° C. (A) is enclosed. Based on the equation of present invention, a fluid nozzle means (e.g. a fogger system) is designed to have a flow rate of about 33.2 liter per hour (or e.g. three foggers having a flow rate of about 11 liter per hour) to dissolve 50 Kg of Ammonium sulphate continuously during two hours. In a second feeder tank, 50 kg of KCl (=Potassium chloride) having solubility of 342 g/liter at 20 C is enclosed. Based on the above equation, a fluid nozzle means (e.g. a fogger system) is designed to have a flow rate of about 73 liter/hour (or e.g. 7 foggers having a flow rate of about 11 liter per hour) to dissolve 50 kg of KCl in two hours. Thus, the fluid injection system according to this example comprises 3 foggers in one tank and 7 foggers in another tank, the foggers having flow rate of about 11 liter per hour in order to dissolve 50 kg of AS in one tank and 50 KG of KCl in another tank continuously for two hours by continuing to dispense the substantially saturated solution of AS and KCl.

In this example, the fluid nozzle means of present invention are specifically designed according to the weight of the product to be dispensed in the tank and its solubility at a given temperature in order to dissolving the two different products proportionally within a desired fertigation time.

The number of fluid nozzle means and their flow rates varies depending on the weight and solubility of the product in the tank at given temperature. For example, when there are 50 kg of AS in tank 1 and 30 kg of KCl according to the above example, 3 (about 11 liter/h) foggers for tank 1 and 4 (about 11 liter/h) foggers for tank 2 are used to dissolve 50 kg of AS in tank 1 and 30 kg of KCl in tank 2 continuously during 2 hours.

Thus, in one embodiment, the ratio of flow rate of the fluid nozzle means (e.g. foggers) in one feeder tank to another feeder tank is adjusted by exchanging, adjusting, and/or controlling the flow rate or increasing/decreasing the number of the fluid nozzle means (e.g. number of foggers) based upon characteristics comprising solubility of the product at a temperature and weight of the product to be dispensed in the feeder tank, and dispensing time.

In another aspect of present invention, a method for dispensing a solution onto a matter is provided. The method of present invention is particularly used for fertigation and irrigation. All of the preceding embodiments apply and are incorporated by reference in their entirety into this embodiment.

In one embodiment, said method comprising injecting fluid into a feeder tank having a product to be dispensed, wherein said fluid is injected at a flow rate of fluid determined based upon characteristics comprising solubility of the product at a temperature, weight of the product to be dispensed or to be dissolved in the feeder tank, and dispensing time. Accordingly, according to one embodiment of the invention, the flow rate of the fluid (e.g. water) introduced into the reservoir tank is regulated.

In another embodiment, the method comprises determining the flow rate by equation 1:

$$F=(W)/(T \times S)$$

wherein,
F is the flow rate of the fluid nozzle means;
W is weight of the product in the feeder tank;
T is dispensing time; and
S is solubility of the product at a temperature.

In another embodiment, the method comprises injecting the fluid into the feeder tank by fluid nozzle means according to any of the preceding embodiments.

In another embodiment, the method further comprises controlling, adjusting the fluid nozzle means before and/or during the dispensing time in order to inject the fluid at the determined flow rate based upon characteristics comprising solubility of the product at a temperature, weight of the product to be dispensed or to be dissolved in the feeder tank, and dispensing time or by equation 1.

In one embodiment, the fluid is introduced into the tank in a continuous manner at the determined flow rate.

In another aspect of present invention, a method for dispensing a solution onto a matter using at least two feeder tank is provided. All of the preceding embodiments apply and are incorporated by reference in their entirety into this embodiment.

In one embodiment, the method comprising injecting a fluid into at least two feeder tanks. At least one feeder tank has a different product therein compared to at least one other feeder tank. The flow rate of the fluid injected into each tank is determined based upon characteristics comprising solubility of a product at a temperature in the feeder tank, weight of the product to be dispensed or to be dissolved in the feeder tank, and dispensing time, i.e. in this embodiment, the flow rate of fluid being injected into each feeder tank is specifically controlled, monitored, and/or adjusted based on the product in that particular feeder tank.

The detailed description set-forth above is provided to aid those skilled in the art in practicing the present invention. However, the invention described and claimed herein is not to be limited in scope by the specific embodiments herein disclosed because these embodiments are intended as illustration of several aspects of the invention. The embodiments set-forth above can be performed and combined with other disclosed embodiments according to the invention. Any equivalent embodiments are intended to be within the scope of this invention. Indeed, various modifications of the invention in addition to those shown and described herein will become apparent to those skilled in the art from the foregoing description which do not depart from the spirit or scope of the present inventive discovery. Such modifications are also intended to fall within the scope of the appended claims. All publications, patents, patent applications and other references cited in this application are incorporated herein by reference in their entirety for all purposes to the same extent as if each individual publication, patent, patent application or other reference was specifically and individually indicated to be incorporated by reference in its entirety for all purposes. Citation of a reference herein shall not be construed as an admission that such is prior art to the present invention.

What is claimed is:

1. A fluid injection system for dispensing a solution, said fluid injection system comprising:
   a feeder tank having a product to be dispensed therein;
   an inlet connection for diverting fluid from a flow line to a fluid nozzle means;
   an outlet connection for dispensing the solution into the flow line or onto a matter;
   wherein the fluid nozzle means is in communication with the feeder tank and the inlet connection and the fluid injection system controls a flow rate of fluid at which the fluid nozzle means introduce the fluid into the feeder tank based upon characteristics comprising solubility of the product at a temperature of the fluid in the feeder tank, weight of the product to be dispensed or to be dissolved in the feeder tank, and dispensing time, and
   wherein the fluid injection system controls a flow rate of the fluid nozzle means to satisfy equation:

$$F=(W)/(T \times S)$$

wherein,
   F is the flow rate of the fluid nozzle means;
   W is weight of the product in the feeder tank;
   T is dispensing time; and
   S is solubility of the product at the temperature of the fluid in the feeder tank, and
   wherein the dispensing time is the designated period of time for dispensing the solution out of the feeder tank.

2. The fluid injection system according to claim 1, the system further comprising a dilution tank, wherein said dilution tank is configured to store and to dispense a diluted solution, and wherein the dilution tank is in communication with the fluid from the flow line and the dispensed solution from the outlet connection.

3. The fluid injection system according to claim 2, wherein the feeder tank and the outlet connection are positioned at a higher elevation than the flow line and/or the dilution tank, and wherein the outlet connection is configured to dispense the solution into the flow line or onto a matter by gravity.

4. The fluid injection system according to claim 1, further comprising one or more additional feeder tanks, wherein each feeder tank has a product to be dispensed therein;
   each feeder tank is in communication with a fluid nozzle means;
   the fluid nozzle means of each feeder tank is in communication with an inlet connection;
   the fluid injection system controls each fluid nozzle means of each feeder tank to introduce the fluid into the feeder tank at a flow rate of fluid determined based upon characteristics comprising solubility of the product at a temperature of the fluid in the feeder tank, weight of the product to be dispensed in the feeder tank, and dispensing time, and
   wherein the fluid injection system controls a flow rate of the fluid nozzle means to satisfy equation:

$$F=(W)/(T \times S)$$

wherein,
   F is the flow rate of the fluid nozzle means;
   W is weight of the product in the feeder tank;
   T is dispensing time; and
   S is solubility of the product at the temperature of the fluid in the feeder tank.

5. The fluid injection system according to claim 1, wherein the system further comprising a control panel programmed to control, adjust, regulate and/or monitor flow rate of fluid nozzle means and/or to control, adjust, regulate and/or monitor dispensing or duration of dispensing of the solution, the diluted solution, and/or the fluid from the flow line.

6. The fluid injection system according to claim 5, wherein the system comprising at least one sensing means designed to detect at least one factor comprising solubility of the product, weight of the product, concentration of the solution, concentration of diluted solution, flow rate, fluid level in the irrigation field, a temperature of the fluid, a temperature of the solution, an electric conductivity of the solution or diluted solution, and any combination thereof.

7. The fluid injection system of claim 1, further comprising an injector, wherein the injector is designed such that the outlet connection is communicated with a main flow line and to cause a negative pressure that sucks a solution to he flowed from the outlet connection to the main flow line.

8. The fluid injection system according to claim 1, wherein the product is a solid fertilizer and/or the fluid is water.

9. A method for dispensing a solution, said method comprising injecting fluid into a feeder tank having a product to be dispensed, wherein said fluid is injected at a flow rate of fluid determined based upon characteristics comprising solubility of the product at a temperature of the fluid in the feeder tank, weight of the product to be dispensed or to be dissolved in the feeder tank, and dispensing time, the dispensing time being a period of supplying the solution in the feeder tank to an outside of the feeder tank and
   wherein the flow rate is determined by equation:

$$F=(W)/(T \times S)$$

wherein,
   F is the flow rate of the fluid nozzle means;
   W is weight of the product in the feeder tank;
   T is dispensing time; and
   S is solubility of the product at the temperature of the fluid in the feeder tank, and
   wherein the dispensing time is the designated period of time for dispensing the solution out of the feeder tank.

10. The method according to claim 9, wherein the fluid is injected into the feeder tank by fluid nozzle means.

11. The method according to claim 10, wherein the method further comprises controlling, monitoring and/or adjusting the fluid nozzle means before and/or during the dispensing time in order to inject the fluid at the determined flow rate according to claim 9.

12. The method according to claim 9, wherein the fluid is introduced into the feeder tank in a continuous manner at the determined flow rate.

13. The method according to claim 9, said method comprising injecting a fluid into one or more additional feeder tanks having different products therein, wherein the flow rate of the fluid injected into each tank is determined based upon characteristics comprising solubility of a product at a temperature of the fluid in the feeder tank, weight of the product to be dispensed or to be dissolved in the feeder tank, and dispensing time, the dispensing time being a period of supplying the solution in the feeder tank to an outside of the feeder tank and wherein the flow rate is determined by equation:

$$F=(W)/(T \times S)$$

wherein,
   F is the flow rate of the fluid nozzle means;
   W is weight of the product in the feeder tank;

T is dispensing time; and

S is solubility of the product at the temperature of the fluid in the feeder tank.

14. The method according to claim 9 for fertigation and/or irrigation.

15. The method according to claim 14, wherein the product is a solid fertilizer and/or the fluid is water.

16. The method according to claim 9, wherein the product is a. solid fertilizer and/or the fluid is water.

17. A fluid injection system for dispensing a solution, said fluid injection system comprising:
- a feeder tank having a product to be dispensed therein;
- an inlet connection for diverting fluid from a flow line to a fluid nozzle means;
- an outlet connection for dispensing the solution into the flow line or onto a matter;
- wherein the fluid nozzle means is in communication with the feeder tank and the inlet connection and the fluid injection system controls a flow rate of fluid at which the fluid nozzle means introduce the fluid into the feeder tank based upon characteristics comprising solubility of the product at a temperature of the fluid in the feeder tank, weight of the product to be dispensed or to be dissolved in the feeder tank, and dispensing time, and
- wherein the fluid injection system controls a flow rate of the fluid nozzle means to satisfy equation:

$$F=(W)/(T \times S)$$

wherein,
- F is the flow rate of the fluid nozzle means;
- W is weight of the product in the feeder tank;
- T is dispensing time; and
- S is solubility of the product at the temperature of the fluid in the feeder tank, wherein the dispensing time is the designated period of time for dispensing the solution out of the feeder tank, and wherein the feeder tank comprises a filter placed at the base of the feeder tank configured to prevent a product from entering said outlet connection, and wherein the filter comprises an overflow pipe which extend into the filter inside the feeder tank.

* * * * *